United States Patent Office 3,655,763
Patented Apr. 11, 1972

3,655,763
PREPARATION OF N,N'-DIARYL-1,4-DIAMINO-
NAPHTHALENE COMPOUND
Donald M. Fenton, Anaheim, Calif., assignor to Union
Oil Company of California, Los Angeles, Calif.
No Drawing. Filed July 17, 1968, Ser. No. 745,350
Int. Cl. C07c 87/66
U.S. Cl. 260—576        6 Claims

ABSTRACT OF THE DISCLOSURE

The title compounds are prepared from naphthalene using the process of this invention which comprises reacting a 1,4-naphthadiol bearing a substituent on the number 2 ring position with an alkali metal bisulfite to obtain a derivative having an alkali metal sulfonate in the 3 position and thereafter contacting the resultant sulfonate with an aryl amine hydrohalide to add the amino groups in the 1 and 4 positions and to simultaneously desulfonate the naphthalene nucleus. The sulfonation step is performed at mild conditions from 25° to 200° C. and the addition of the aryl amine hydrohalide is performed at a temperature of from 100° to 350° C. The subject compounds produced by this process are useful as antioxidants and in particular are useful as antioxidants in rubber compositions by incorporation in rubber in amounts from about 0.01 to about 5.0 weight percent in the conventional manner for the use of antioxidants.

DESCRIPTION OF THE INVENTION

This invention relates to N,N'-diaryl-1,4-diaminonaphthalene compounds and to a method for their preparation.

The invention comprises the addition of a sulfonate group to the 3 position of a 2-halo or hydrocarbyl 1,4-naphthadiol to temporarily shield the 3 position against reaction followed by subsequent treatment of the resulting naphthalene sulfonate with an aryl amine hydrohalide under conditions whereby the aryl amine adds to the 1 and 4 position of the naphthalene and the hydrohalide release in this reaction causes the desulfonation of the naphthalene nucleus, thereby resulting in the synthesis of the parent compounds in a single stage reaction.

Naphthalene is a useful raw material for chemical industry and can be useful as a raw material or intermediate in the preparation of various industrial chemicals. A disadvantage of the use of naphthalene is the large number of ring positions available for reaction which causes the formation of a mixture of numerous isomers when the naphthalene is subjected to conventional processing. A considerable amount of this random substitution can be avoided by the proper substitution of the naphthalene nucleus. A suitable source of raw material comprises the beta-substituted naphthalenes wherein the highly reactive beta position is substituted with halogen or a suitable hydrocarbyl group, e.g., alkyl, cycloalkyl or aryl. The active sites in the para or 1,4-ring position of the naphthalene can be obtained by suitable reaction, e.g., the reaction of beta-substituted naphthalene with chromium trioxide in acetic acid yields the beta-substituted 1,4-naphthoquinone.

The quinone can be further reacted by reduction of the carbonyl groups to hydroxyls with a suitable reducing agent, e.g., an alkali metal dithionite, hydrazine, etc. The resulting 1,4-naphthadiol is suitable for further reaction to prepare chemical intermediates or raw materials, however the 3 ring position is highly active and is often more reactive than the hydroxyl groups.

I have now found that the 1,4-naphthadiol compounds bearing a beta hydrocarbyl or halo substitutent can be further reacted without ring substitution in the 3 position by the temporary sulfonation of the naphthalene nucleus. The sulfonation occurs substantially exclusively in the 3 position and provides a temporary shield against subsequent substitution in this position. I have further found that the resulting 1,4-naphthadiol sulfonate can be reacted with an aryl amine hydrohalide and, in a single step, be substituted in the 1,4-positions with the amino aromatic and desulfonated to prepare the desired N,N'-diaryl-1,4-diamino-2-hydrocarbyl or halo naphthalene products.

The reactants for the process of my invention which comprises the steps of sulfonation followed by amination and desulfonation comprise an 1,4-naphthadiol reactant bearing a hydrocarbyl or halo substituent in the beta position. The positions of the naphthalene ring, i.e., the 5, 6, 7 and 8 positions, can be substituted with other hydrocarbyl groups and accordingly the formula for the suitable reactants is as follows:

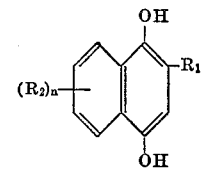

wherein:

$R_1$ and $R_2$ are halo, alkyl, cycloalkyl with 5 or 6 ring carbons or monocyclic aryl with no more than about 12 carbons; and $n$ is from 0 to 4.

The R groups indicated previously can be any alkyl, e.g., methyl, ethyl, propyl, isopropyl, butyl, sec-butyl, amyl, cyclopentyl, cyclohexyl, hexyl, heptyl, 2-ethylhexyl, methylcyclopentyl, methylcyclohexyl, octyl, propylene tetramer, etc. The R groups can likewise be any suitable monocyclic aromatic containing up to 12 carbons, e.g., phenyl, tolyl, xylyl, ethylphenyl, cumenyl, sec-hexylphenyl, etc. Similarly the R groups can be any suitable halogen, e.g., chloro, bromo, iodo or fluoro.

Examples of suitable reactants include 2-methyl-1,4-naphthadiol,
2-ethyl-1,4-naphthadiol, 2-iso-propyl-6-chloro-1,4-naphthadiol,
2-cyclohexyl-1,4-naphthadiol,
2-phenyl-1,4-naphthadiol,
2-tolyl-7-chloro-1,4-naphthadiol,
2-chloro-1,4-naphthadiol,
2,6-dibromo-1,4-naphthadiol,
2-iodo-7-methyl-1,4-naphthadiol,
2,5-dimethyl-1,4-naphthadiol,
2,6,7-trimethyl-1,4-naphthadiol,
2,6-amyl-1,4-naphthadiol,
2-methyl-6-cyclohexyl-1,4-naphthadiol,
2,8-dimethyl-1,4-naphthadiol,
2-methyl-7-cyclohexyl-1,4-naphthadiol,
2,6-dicyclopentyl-1,4-naphthadiol,
2,5,6,7,8-pentachloro-1,4-naphthadiol,
2-heptyl-1,4-naphthadiol,
2-dodecyl-1,4-naphthadiol, etc.

Many of the aforementioned reactants can be obtained commercially, however these reactants can also be obtained from naphthalene by alkylation or halogenation to substitute the naphthalene with the aforeindicated substituents. The beta-substituted naphthalene can then be reacted with suitable means to prepare the 1,4-derivatives, e.g., oxidation by contacting chromium trioxide in acetic acid with beta-substituted naphthalenes yields the beta-substituted 1,4-naphthoquinones.

The quinone can then be reduced with a suitable reducing agent, e.g., reaction with alkali metal dithionites or with hydrazine or other reducing agents at temperatures from about 25° to 200° C. under liquid phase conditions, e.g., with an aqueous solution of the reducing agent. Aqueous solutions of alkali metal dithionites, e.g., sodium, lithium, potassium or cesium dithionites in molar concentrations from 0.1 to about 10 molar can be employed as the reducing agent. If desired, the reduction can also be performed by treatment with aqueous solutions of hydrazine hydrate.

The 2-substituted-1,4-naphthadiol which is produced by the aforementioned reduction can then be reacted with a suitable sulfonating agent, e.g., sulfurous acid or alkali metal bisulfites, e.g., sodium, lithium, potassium or cesium bisulfite, or metal sulfites, e.g., sodium metabisulfite, potassium metabisulfite, lithium metabisulfite or cesium metabisulfite. The concentration of the sulfonating agent should be about 0.1 to about 10 molar and this treatment is performed at temperatures of from about 25° to about 200° C. The reaction can be monitored by observation of the formation of the white precipitate which comprises the alkali metal sulfonate salt of the 1,4-naphthadiol reactant. The latter material can be recovered from the aqueous solution used in its preparation by filtration and the recovered solid can be thereafter reacted with the aryl amine hydrohalide in accordance with my invention. This sulfonation occurs almost entirelyin the 3 ring position.

The alkali metal sulfonate is then admixed with an aryl amine hydrohalide. If desired, this admixture can be performed in the presence of a suitable inert solvent. These reactants are heated to a temperature of about 100° to about 350° C. and at this temperature range will react with evolution of gases, chiefly sulfur dioxide with some water vapor and hydrohalide gas. The reaction can be continued until the evolution of the gas substantially ceases, a reaction period of from several minutes to 12 hours, depending on the temperature of the reactants. The naphthalene and arylamine reactants are admixed in approximately stoichiometric quantities, i.e., with approximately 2 molar quantities of the aryl amine hydrohalide per mol of the alkali metal sulfonate of the 1,4-naphthadiol. Use of the stoichiometric ratio aforeindicated reduces the purification steps necessary, however it is within the scope of the invention to employ these reactants in mol ratios of from 10:1 to 1:10. The reaction can be performed batchwise or in a continuous fashion by conventional procedures. In batchwise processing the reactants can be charged to the reaction zone and heated therein to the necessary temperature and maintained at the reaction temperature for a sufficient time to complete the reaction. In continuous processing, the reactants can be introduced into the reaction zone in a continuous manner and the reaction zone can be sized to provide a sufficient residenec time therein for completion of the reaction. In either processing, the crude reaction product is removed from the reaction zone and treated to recover the desired N,N'-diaryl-1,4-diamino naphthalene bearing a substituent in the 2 ring position. This amino hydrocarbon can be recovered by any suitable purification step, e.g., extraction with solvents or by distillation. A suitable procedure comprises extraction in alcoholic solvents or other selective solvents such as ethers, esters, ketones or aromatic hydrocarbons.

Examples of suitable alcohols include methanol, ethanol, isopropanol, butanol, 2-ethylhexanol, etc. The extract so obtained can then be concentrated by volatilization of the alcoholic solvent to crystallize the desired product therefrom. The products can be further purified if necessary by liquid solid chromatography. A suitable solid support is alumina. This is accomplished by passing a liquid solution of the product over a bed of the solid, e.g., through a column packed with alumina at ambient conditions of temperature and pressure.

The aryl amine hydrohalide employed as the reactant can be any hydrohalide of aniline or amino naphthalene and their alkyl derivatives thereof containing up to 3 alkyl groups with from 1 to 8 carbons in the alkyl groups. Examples of suitable reactants include aniline hydrochloride, toluidine hydroiodide, cumenylamine hydrochloride, pseudocumenylamine hydrochloride, xylylamine hydrochloride, p-ethylphenylamine hydrobromide, o-amylphenylamine hydrochloride, p-octylphenylamine hydrochloride, alpha-amino-naphthalene hydrobromide, beta-aminonaphthalene hydrofluoride, 6,7-dimethyl-beta-aminonaphthalene hydrofluoride, o-isopropylalpha-aminonaphthalene hydroiodide, 4,6,7-triethyl-beta-amino-naphthaline hydrochloride, 4-octyl-2-aminonaphthalene hydrochloride, 6-butyl-1-amino-naphthalene hydrochloride, 7-amyl-2-aminonaphthalene hydrochloride, etc.

The following example will illustrate a mode of practice of the invention and demonstrate results obtainable thereby:

EXAMPLE 1

In this preparation the 1,4-naphthadiol was prepared from the 1,4-quinone by the addition of 15 grams of 2-methylnaphthaquinone, 200 milliliters diethyl ether and 35 grams sodium hydrosulfide and 100 milliliters of water to a flask which was stirred for 2 hours at room temperature. A pale yellow solution was formed and the admixture was permitted to separate into distinct phases, the aqueous phase was discarded and the diethyl ether phase was then reacted by the addition thereto of a concentrated aqueous solution containing 60 grams sodium bisulfite. The admixture was heated to vaporize the ether therefrom and at 70° C. an exothermic reaction occurred with the formation of a white precipitate comprising the sodium sulfonate of 2-methyl-1,4-naphthadiol.

The white precipitate was separated by filtration and 19 grams of the separated solid was admixed with 23 grams of aniline hydrochloride and the admixture was heated to 230° C. and maintained at that temperature for 9 hours. A vigorous evolution of gases was observed upon heating of the reactants. After completion of the reaction period, the reactants were admixed with 500 milliliters of methanol and the methanol extract was removed therefrom and concentrated in a steam bath to 100 milliliters. The concentrated extract was then contacted with 100 milliliters of water and 500 milliliters of diethyl ether and the admixed solvents were permitted to separate into two distinct phases. The ether layer was chromatographed on activated alumina, separated into fractions and concentrated to obtain a red-purple solid, melting point 185° C., with an analysis of 86.8 percent carbon and 5.9 percent hydrogen corresponding to the theoretical for $C_{23}H_{20}N_2$ of 85.1 percent carbon and 5.8 percent hydrogen. The infrared spectrum identified the product as N,N'-diphenyl-1,4-diamino-2-methylnaphthalene.

When the reaction is repeated using as the reactant 2-phenyl-1,4-naphthadiol, a similar reaction to prepare N,N-diphenyl-1,4-diamino-2-phenylnaphthalene occurs.

When the reaction is repeated with the substitution of p-toluidine hydrobromide, a similar reaction to prepare the N,N'-di-p-tolyl-1,4-diamino - 2 - methylnaphthalene occurs.

When the reaction is repeated with the substitution of 1-aminonaphthalene hydrochloride, a similar reaction to produce N,N-dinaphthyl-1,4-diamino - 2 - methylnaphthalene occurs.

When the reaction is repeated with substitution of 2,6,7-trichloro-1,4-naphthadiol for the 2-methyl-1,4-naphthadiol previously used, a similar reaction to prepare the N,N'-diphenyl-1,4-diamino-2,6,7-trichloronaphthalene occurs.

When the reaction is repeated with substitution of 2-cyclohexyl-1,4-naphthadiol, similar reaction to N,N'-diphenyl-1,4-diamino-2-cyclohexylnaphthalene occurs.

The preceding example is intended solely to illustrate a preferred mode of practicing my invention and to demonstrate results obtainable thereby. It is not intended that this exemplified disclosure be unduly limiting of the invention but rather it is intended that the invention be defined by the reagents and steps and their obvious equivalents set forth in the following claims.

I claim:

1. The preparation of N,N'-diaryl-1,4-diaminonaphthalene compounds which have a $R_1$ substituent in the 2-naphthalene ring position and which have up to four $R_2$ substituents in the 5, 6, 7 and 8 naphthalene ring positions which comprises sulfonating a naphthalene reactant of the following structure:

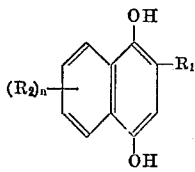

wherein:

$R_1$ and $R_2$ are halo or alkyl, cycloalkyl with 5 or 6 ring carbons or phenyl or phenyl substituted with alkyl group having from 1 to 6 carbon atoms; and $n$ is from 0 to 4 by contacting said naphthalene reactant with an alkali metal or ammonium bisulfite at a temperature from 25° to 200° C., to add an alkali metal or ammonium sulfonate in the 3 position and thereafter contacting the resultant sulfonated reactant with an aryl hydrohalide selected from the class consisting of the hydrohalides of aniline and aminonaphthalene and alkyl derivatives thereof containing up to 3 alkyl groups with from 1 to 8 carbons in said groups at a temperature of from 100° to 350° C. to react said aryl hydrohalide with the hydroxyls on said naphthalene sulfonated reactant and to desulfonate the sulfonated reactant to the N,N'-diaryl-1,4-diaminonaphthalene compound bearing said $R_1$ substituent and said up to four $R_2$ substituents.

2. The preparation of claim 1 wherein said aryl amino hydrohalide is aniline hydrohalide.

3. The preparation of claim 1 wherein said aniline hydrohalide is aniline hydrochloride.

4. The preparation of claim 1 wherein said naphthalene reactant is 2-methyl-1,4-naphthadiol.

5. The preparation of N,N'-diaryl-1, 4-diaminonaphthalene compounds which have a $R_1$ substituent in the 2-naphthalene ring position and which have up to four $R_2$ substituents in the 5, 6, 7 and 8 naphthalene ring positions which comprises contacting a naphthalene reactant having the following structure:

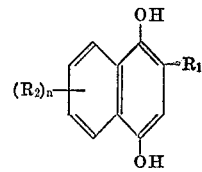

wherein:

$R_1$ and $R_2$ are halo or alkyl having no more than 12 carbons; and $n$ is from 0 to 4;

with an alkali metal or ammonium bisulfate at a temperature of 25 to 150° C. to add an alkali metal or ammonium sulfonate to said naphthalene reactant on the number 3 position and thereafter contacting the resultant sulfonated reactant with aniline hydrohalide at a temperature from 100° to 350° C. to react said aniline hydrohalide with the hydroxyls on said naphthalene sulfonated reactant and to desulfonate said sulfonated reactant to the N,N'-diaryl-1,4-diaminonaphthalene compound bearing said $R_1$ substituent and said up to four $R_2$ substituents.

6. The preparation of claim 5 wherein said naphthalene reactant is 2-methyl-1,4-naphthadiol.

References Cited

UNITED STATES PATENTS 2,029,642    2/1936    Semon _____ 260—576

OTHER REFERENCES

Drake, "The Bucherer Reaction," Organic Reactions, vol. 1, New York; John Wiley & Sons, Inc. (1954), pp. 105–108 and 110–113.

JOSEPH REBOLD, Primary Examiner

C. F. WARREN, Assistant Examiner

U.S. Cl. X.R.

260—509